United States Patent
Dickinson

(10) Patent No.: US 8,995,795 B1
(45) Date of Patent: Mar. 31, 2015

(54) AUTOMATED CLEANUP OF DIGITAL VOLUMES

(75) Inventor: Dana L. Dickinson, San Jose, CA (US)

(73) Assignee: Google Inc., Mountain View, CA (US)

( * ) Notice: Subject to any disclaimer, the term of this patent is extended or adjusted under 35 U.S.C. 154(b) by 532 days.

(21) Appl. No.: 13/396,587

(22) Filed: Feb. 14, 2012

Related U.S. Application Data

(60) Provisional application No. 61/443,563, filed on Feb. 16, 2011.

(51) Int. Cl.
*G06K 9/03* (2006.01)
*G06Q 30/02* (2012.01)

(52) U.S. Cl.
CPC .................... *G06Q 30/0202* (2013.01)
USPC ......................................... 382/310

(58) Field of Classification Search
None
See application file for complete search history.

(56) References Cited

U.S. PATENT DOCUMENTS

| | | | |
|---|---|---|---|
| 8,196,030 B1 * | 6/2012 | Wang et al. | 715/200 |
| 2009/0028392 A1 * | 1/2009 | Ramachandrula et al. | 382/112 |
| 2009/0263019 A1 * | 10/2009 | Tzadok et al. | 382/176 |
| 2010/0191748 A1 * | 7/2010 | Martin et al. | 707/750 |
| 2012/0177295 A1 * | 7/2012 | Gronau et al. | 382/218 |

* cited by examiner

*Primary Examiner* — Jon Chang
(74) *Attorney, Agent, or Firm* — Fenwick & West LLP

(57) ABSTRACT

Textual errors in digital volumes in a corpus are corrected by comparing a set of similar digital volumes, the set including a basis volume and a plurality of comparison volumes. The basis volume is compared with the comparison volumes to identify sequences of text that are identical across all of the candidate volumes and mismatched sequences of text that contain different text in at least one of the candidate volumes. The correct text for at least some of the mismatched sequences is resolved by comparing the different text in the different candidate volumes. The mismatched sequences are replaced by the resolved correct text, thereby correcting errors in the candidate volumes.

18 Claims, 3 Drawing Sheets

AUTOMATED CLEANUP OF DIGITAL VOLUMES

CROSS-REFERENCE TO RELATED APPLICATIONS

This application claims the benefit of U.S. Provisional Patent Application No. 61/443,563, entitled "Automated Cleanup of Digital Volumes," filed on Feb. 16, 2011, which is hereby incorporated by reference in its entirety.

BACKGROUND

1. Field of Disclosure

The disclosure generally relates to the field of digitizing books and in particular to correcting errors in digital volumes produced from the books.

2. Background Information

A digital corpus may be created by scanning books and other text in one or more libraries. The pages of the books are scanned to produce digital images, and the images are then converted into digital text volumes through optical character recognition (OCR). The resulting digital volumes may then be used for a variety of purposes, such as for creating content for use with electronic reading (eReader) devices and for searching in response to queries.

Some types of library books, such as those that have fallen into the public domain, tend to be quite old. The pages of these books are frequently marked up, warped, or otherwise suboptimal for scanning purposes. In addition, since it is usually necessary to preserve these types of books, the books are scanned using non-destructive (ND) techniques that produce scans of lower quality than scans produced using destructive techniques.

The lower quality of scans for older books negatively impacts the quality of OCR performed on the books. In addition, older books often use fonts that make accurate OCR even more challenging. As a result, digital volumes produced from these types of books tend to have lower-quality OCR than volumes produced from other types of books. These lower-quality volumes are thus less suitable for reading, searching, and other purposes.

SUMMARY

The above and other issues are addressed by a computer-implemented method, non-transitory computer readable storage medium, and computer system for correcting textual errors in digital volumes in a corpus. An embodiment of the method comprises comparing a basis volume with a plurality of comparison volumes to identify sequences of text that are identical across all of the candidate volumes and mismatched sequences of text that contain different text in different candidate volumes. The method also comprises resolving at least some of the mismatched sequences by comparing the different text in the different candidate volumes to ascertain correct text for the mismatched sequences, and correcting errors in the candidate volumes using the resolved mismatched sequences.

An embodiment of the computer system for correcting textual errors in digital volumes in a corpus comprises a non-transitory computer-readable storage medium storing executable computer program instructions, the computer program instructions comprising for comparing the basis volume with the comparison volumes to identify sequences of text that are identical across all of the candidate volumes and mismatched sequences of text that contain different text in different candidate volumes. The instructions also comprise instructions for resolving at least some of the mismatched sequences by comparing the different text in the different candidate volumes to ascertain correct text for the mismatched sequences, and correcting errors in the candidate volumes using the resolved mismatched sequences. The computer system further comprises a processor for executing the computer program instructions.

An embodiment of the non-transitory computer-readable storage medium stores executable computer program instructions for correcting textual errors in digital volumes in a corpus, the instructions executable to perform steps comprising comparing the basis volume with the comparison volumes to identify sequences of text that are identical across all of the candidate volumes and mismatched sequences of text that contain different text in different candidate volumes. The steps also comprise resolving at least some of the mismatched sequences by comparing the different text in the different candidate volumes to ascertain correct text for the mismatched sequences, and correcting errors in the candidate volumes using the resolved mismatched sequences.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
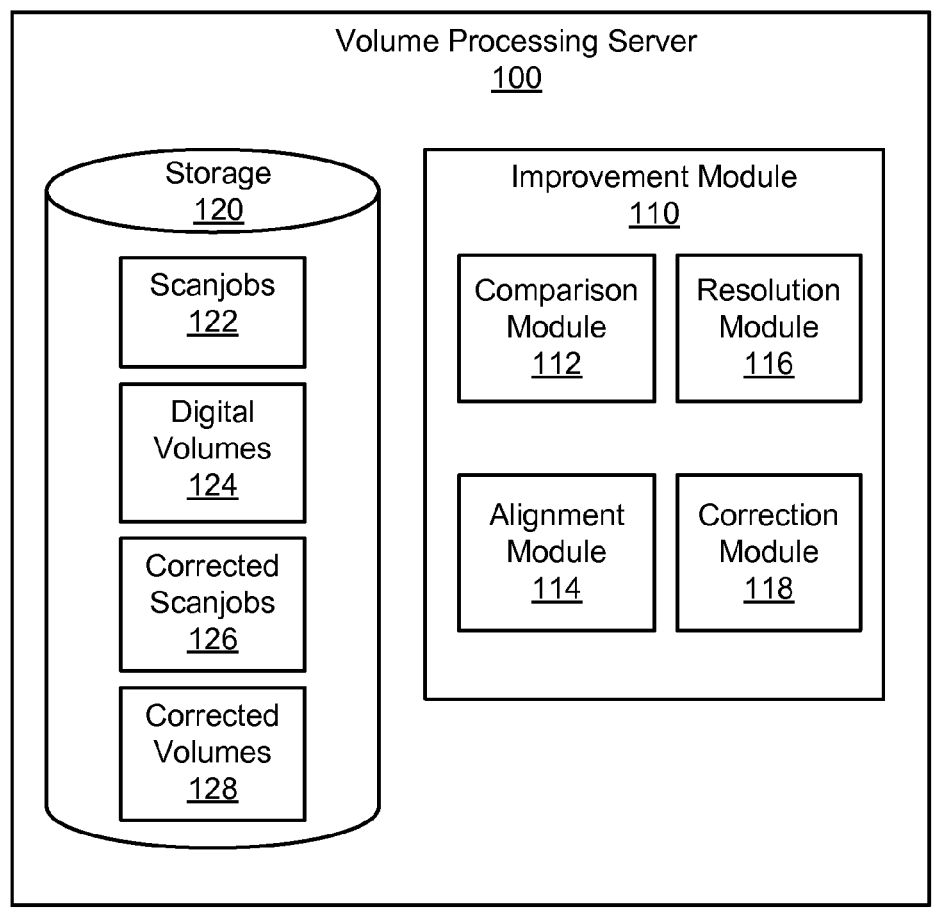
FIG. 1 is a high-level block diagram of a volume processing server for improving the quality of digital volumes, according to one embodiment.

FIG. 1 is a high-level block diagram of a volume processing server 100 for improving the quality of digital volumes 124, according to one embodiment. The server 100 includes an improvement module 110 and a storage module 120. Only one server 100, improvement module 110, and storage module 120 are shown in FIG. 1 in order to simplify and clarify the description. However, various embodiments have multiple instances of these entities. Moreover, the entities can be distributed across multiple machines. For example, the volume improvement module 110 and storage module 120 can be distributed across multiple servers.

The storage module 120 stores data associated with digital text volumes. A digital text volume (or simply a "volume") is a digital representation of a book in which the text is in a machine-readable format. A volume may contain images in addition to the text. As used herein, the term "book" refers to a collection of text, such as traditional printed physical book, magazine, or newspaper. The collection of digital volumes, in turn, forms a digital corpus. The corpus may be formed of volumes from one or more libraries.

In one embodiment, the data stored by the storage module 120 include scanjobs 122 storing text produced from scans of the books. Typically, the content of a scanjob 122 is produced by optically-scanning the pages of a book to produce digital images, performing OCR processing on the page images, and then storing the text produced by the OCR as a scanjob for the book. A given book may be scanned multiple times, to produce multiple scanjobs for the book.

The scanjobs 122 stored by the storage module 120 often include textual errors due to the problems inherent in the scanning and OCR process. Such errors are particularly present for scanjobs of older books such as those that have fallen into the public domain. In general, an error is present if the text of a scanjob does not match the text of the associated book.

The storage module 120 also stores digital volumes 124 produced from the scanjobs 122, which collectively form the digital corpus. A digital volume 124 includes the text of the corresponding book, as determined from the one or more scanjobs 122 for the book. A digital volume also includes metadata associated with the book, such as the title, author, publisher, etc. The digital volumes 124 can be used for many purposes, e.g., a digital volume can be used to prepare an electronic publication (epub) for reading using an eReader, for searching to enable research of the corpus, etc.

The digital volumes 124 in the corpus often include multiple versions of the same book. For example, different instances of the same edition of a book may be scanned into separate scanjobs and formed into separate digital volumes 124. Different editions of the same book may also be scanned into separate scanjobs and formed into separate digital volumes 124. Thus, the corpus might include multiple different digital volumes 124 of the public domain book *Robinson Crusoe*, corresponding to scans of different instances of the same edition of the book, and scans of different editions of the book. These digital volumes 124 may have differences due to textual errors introduced in the scanning process, or textual differences in the different editions of the book.

The storage module 120 additionally stores corrected scanjobs 126 and corrected volumes 128 produced by the improvement module 110. As discussed below, the corrected scanjobs 126 correspond to the original scanjobs 122, except that textual errors within the scanjobs have been corrected by the improvement module 110. These corrected scanjobs 126 are used to produce the corrected digital volumes 128 and/or for other purposes. The corrected digital volumes 128 may be substituted for the uncorrected digital volumes 124 in order to improve the overall quality of the digital corpus.

The improvement module 110, in turn, compares digital volumes 124 in order to identify and correct textual errors contained within the volumes. For example, the improvement module 110 may compare several digital volumes of Robinson Crusoe in order to identify and correct textual errors in each. In the illustrated embodiment, the improvement module 110 includes four modules, a comparison module 112, an alignment module 114, a resolution module 116, and a correction module 118. Other embodiments of the improvement module 110 include different and/or additional modules. In addition, the functions may be distributed among the modules in a different manner than described herein.

The comparison module 112 compares multiple digital volumes 124 corresponding to a same book to identify sequences of matching text. Here, the "same book" refers to different instances of the same edition of a book and/or different editions of the book. In one embodiment, the comparison module 112 compares a set of at least three candidate volumes that are likely to contain large amounts of text in common. The candidate volumes are selected from the digital volumes 124 in the corpus. In one embodiment, a dimensionality reduction is performed by applying a set of hash functions to each the digital volumes 124. The dimensionality reduction generates a set of values that represent each digital volume 124. Digital volumes 124 with similar sets of hash values are selected as candidate volumes. Alternatively, metadata of the digital volumes 124 may be examined to identify a set of volumes having the same title (e.g., Robinson Crusoe). Other methods known in the art for selecting similar digital volumes 124 may also be used. Regardless of how the set of candidate volumes is selected, the set is provided to the comparison module 112 for analysis.

In one embodiment, the comparison module 112 selects one of the candidate volumes in the set as the "basis volume." The selection process may be random. The comparison module 112 compares the basis volume with each of the other candidate volumes in the set, referred to as the "comparison volumes." Through these comparisons, the comparison module 112 identifies text sequences that are identical in pairs of the candidate volumes.

The alignment module 114 identifies the locations of text sequences that are identical across all of the candidate volumes. To find the locations (i.e., a process called "alignment"), the alignment module 114 identifies locations of text portions in the basis volume that are identical to text portions in all of the comparison volumes. For each of these portions in the basis volume, the alignment module 114 determines the location of the corresponding identical portion in each of the comparison volumes. The result of this alignment is that each candidate volume has a series of aligned identical text sequences. The identical text sequences are separated by mismatched text sequences that differ in different candidate volumes.

A resolution module 116 resolves (i.e., corrects) the mismatched sequences identified by the alignment module 114. To this end, the resolution module 116 examines each mismatched sequence in the basis volume. For a mismatched sequence, the resolution module 116 compares the corresponding mismatched sequences across all of the candidate volumes to identify the correct text for the sequence.

The correction module 118 uses the corrected version of the text to correct the scanjobs 122 for the individual candidate volumes in the set. The correction module 118 then uses the corrected scanjobs 126 to produce corrected digital volumes 128. Alternatively, the correction module 118 may produce corrected digital volumes 128 directly using the corrected text determined by the resolution module 116. The corrected digital volumes 128 are stored in the storage module 120, and may be substituted for the original, uncorrected digital volumes 124.

The improvement module 110 thus improves the quality of the digital volumes 124. The operation of the improvement module 110 is described in greater detail below with reference to FIG. 3, which illustrates an exemplary method for providing the functionality described above.

Figure 2:
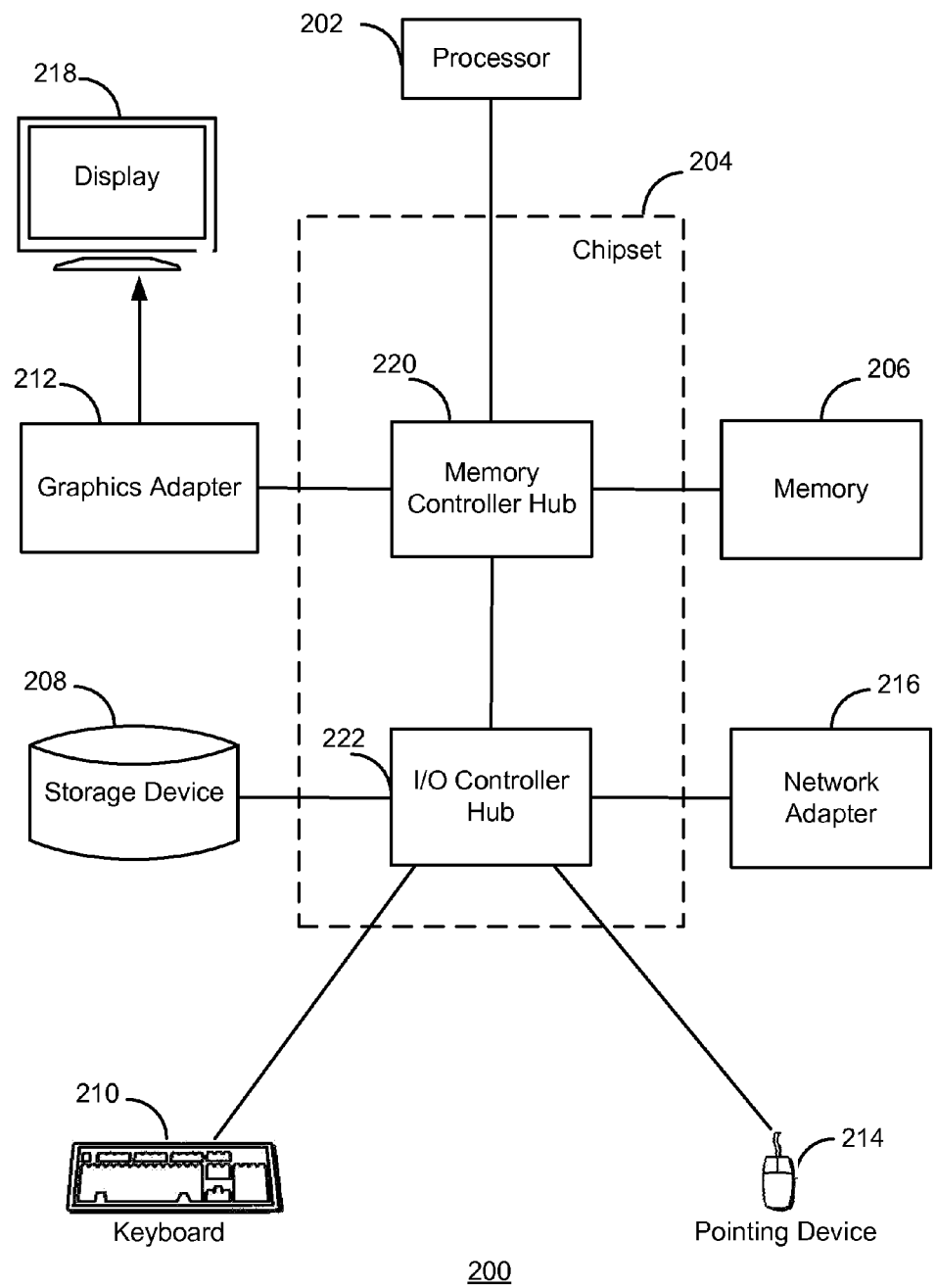
FIG. 2 is a high-level block diagram illustrating an example of a computer for use as the volume processing server shown in FIG. 1, according to one embodiment.

The volume processing server 100 shown in FIG. 1 is implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

Some embodiments of the computer 200 have different and/or other components than those shown in FIG. 2. The types of computer 200 can vary depending upon the embodiment and the desired processing power. For example, the volume processing server 100 might comprise multiple blade servers working together to provide the functionality described herein. A computer 200 can lack some of the components described above, such as keyboards 210, graphics adapters 212, and displays 218.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
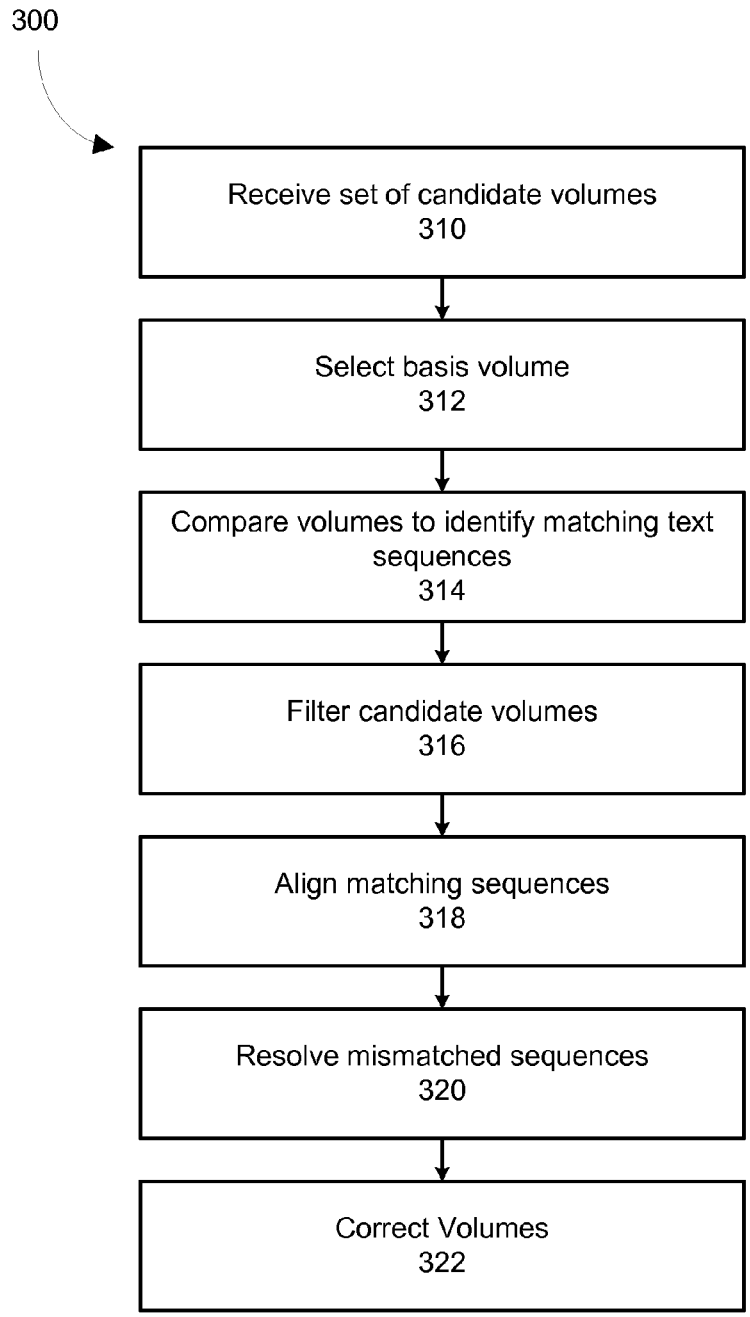
FIG. 3 is a flowchart illustrating a method 300 for improving the quality of digital volumes, according to one embodiment.

FIG. 3 is a flowchart illustrating a method 300 for improving the quality of digital volumes, according to one embodiment. FIG. 3 attributes the steps of the method to the improvement module 110. However, some or all of the steps may be performed by other entities. In addition, some embodiments may perform the steps in parallel, perform the steps in different orders or perform different steps.

Initially, in step 310, the improvement module 110 receives a set of candidate digital volumes for improvement. The candidate volumes are likely to contain large amounts of text in common. For example, the candidate volumes may be digital volumes for the same, or different, editions of a given book. In step 312, the improvement module 110 selects one of the candidate volumes as the basis volume. In one embodiment, the basis volume is selected arbitrarily. The other candidate volumes in the set constitute the comparison volumes.

In step 314, the improvement module 110 compares the basis and comparison volumes to identify sequences of text that are identical across all of the candidate volumes. For this purpose, the improvement module 110 compares the basis volume with each candidate volume to identify identical text sequences. In one embodiment, when comparing the basis volume with a comparison volume, the improvement module 110 slides a 32-byte window across the text of the basis volume. For English-language text, one byte typically represents one character of text. In many other languages, more than one byte is used per character. Therefore, in other embodiments, sliding windows of larger widths are used.

For the comparison, the sliding window is initially placed at the start of the basis volume and thus contains the first 32 bytes of the basis volume. These 32 bytes are compared with the comparison volume to determine if they match any 32-byte sequences contained therein. If one or more matching sequences are found, each matching sequence is further processed. For each location where a matching 32-byte sequence is found in the comparison volume, the total number of consecutive bytes that match both the basis and comparison volumes is determined. For each matching sequence, the starting point of the sequence in each volume and the total length of the match are recorded.

Once the matching sequences identified for the current window position in the basis volume have been processed, the window is slid forward toward the end of the basis volume. If no matching sequences were found, then the window is slid one byte. If a matching sequence was found, the window is slid so that it begins 31 bytes before the end of the matching sequence. In this way, the last byte in the window is the unmatched byte that signified the end of the matching sequence. If more than one matching sequence was found for the previous window position, the shortest sequence is selected and the window repositioned as described above for the case where a single matching sequence was identified. Once the window has been slid, the new 32-byte sequence it now contains is again compared with the comparison volume to identify matching sequences. This comparing repeats until the window reaches the end of the basis volume text. This comparison generates a collection of matching sequences for the comparison volume. Each matching sequence includes indications of the locations in the basis and comparison volumes at which it begins and a length.

The improvement module 110 arranges the matching text sequences by length, starting with the longest, and considers each sequence for inclusion in a final list of matching sequences. An embodiment of the improvement module 110 performs two tests to determine whether a text sequence is included in the final list. First, if the sequence overlaps with a sequence already on the list, it is discarded. In one embodiment, a sequence with a small overlap is truncated to remove the overlapping bytes and then reconsidered. If the first test is passed, the improvement module 110 checks the start position of the sequence to determine if it lies between its neighboring sequences, both in the basis volume and the comparison volume. If it does not lie between, the sequence is discarded. Otherwise, the sequence is included in the final list. Once this process has been completed, the final list includes a list of all the bytes matching the basis volume and the comparison volume that occur in the same order in both volumes.

After performing the comparison step 314 described above between the basis volume and a comparison volume, the improvement module 110 determines the amount of text in common between the two volumes. In other words, the improvement module 110 determines the proportion of text that is identical in the basis and comparison volumes to the overall amount of text in the volumes. If the amount of common text is below a predetermined threshold, 96% in one embodiment, the improvement module 110, in step 316, filters out the comparison volume by removing it from the set of candidate volumes. Thus, after the filtering step 316 the candidate set contains only volumes that have the threshold amount of text in common.

In step 318, the improvement module 110 aligns the matching text sequences by finding the locations of any sequences that are identical across all of the (filtered) candidate volumes. To identify sequences that are identical across all of the candidate volumes, an embodiment of the improvement module 110 represents the text of the basis volume as an array. The improvement module 110 counts, for each character in the basis array, the number of comparison volumes that it matches. Those characters that have counts matching the number of comparison volumes are common across all of the candidate volumes. The beginning and end point in each candidate volume of each common sequence is recorded, and the common sequences are thereby aligned across all volumes 124.

After the alignment step 318, the sizes of the aligned identical text sequences are the same across all of the candidate volumes, and there is the same number of aligned sequences in each volume. Specifically, each candidate volume starts and ends with a mismatched sequence and alternates between identical and mismatched sequences. The mismatched sequences contain different text in different volumes, and can be empty in some volumes. For example, if one candidate volume contains an erroneous additional character, all candidate volumes that do not include the erroneous character will have an empty mismatched sequence at the point where the erroneous character appears in the differing volume.

In step 320, the improvement module 110 attempts to resolve the mismatched sequences by determining the correct text for the sequences. Generally, a mismatch is resolved in step 320 by identifying the corresponding mismatched sequence in all of the candidate volumes, and comparing the differing texts of the mismatched sequences to ascertain the correct text. "Corresponding," in this case, refers to being located in the same place in the sequence of mismatched and identical text in the candidate volumes. The improvement module 110 replaces the mismatched sequences in the basis array with the resolved sequences and thereby forms a corrected, or "golden," version of the text that includes the identical portions and the resolved portions.

In one embodiment, the improvement module 110 resolves a mismatched sequence by determining the type of mismatch, and then applying a resolution technique based on the mismatch type. For example, a mismatched sequence may be classified as either a spelling mismatch or a whitespace mismatch. A spelling mismatch occurs if there are incorrect or missing characters, including differences in capitalization, among the corresponding mismatched sequences in the candidate volumes. A whitespace mismatch occurs if all of the corresponding mismatched sequences contain only whitespace, and there is a difference in the type or amount of whitespace in the sequences. For example, a whitespace error might be a missing or inserted space. A whitespace error can also be a newline character at a place other than the end of a paragraph.

An embodiment of the improvement module 110 resolves spelling mismatches by using a voting solution that treats the mismatched portion shared by the majority (or plurality) of candidate volumes as correct. The improvement module 110 considers each version of the mismatched sequence a vote for that version, and selects the version with the most votes as the correct sequence. Thus, if there are three volumes, and two of the three volumes share the same text for a given mismatched sequence, the improvement module 110 selects the shared text as correct.

In other embodiments, rather than accepting a simple majority or plurality of votes as indicating the correct version, a threshold amount of agreement is required, e.g., 60% of the volumes must agree. If none of the variations reach this threshold, the mismatched sequence is marked as unresolved.

In one such embodiment, unresolved mismatches are marked with a "best guess" along with an associated indicator of certainty, e.g., if a first version of a mismatched sequence appears in 50% of the volumes 124, but a threshold of 60% has been set for automatic correction, the mismatch will be marked as unresolved, but most likely to be the first version with a 50% probability. In other embodiments, other factors are considered while determining the resolution of mismatches, e.g., by comparing the possible options to a dictionary, or by considering the statistical likelihood of the mismatched characters following the last matched (i.e., assumed to be correct) characters.

In some embodiments, mismatched text is first converted into all uppercase and re-checked. If the text is now found to be identical across all comparison volumes, the mismatch is identified as a "case mismatch." In one such embodiment, case mismatches are ignored. In another such embodiment, the case of each character that is most common across the basis and comparison volumes is selected.

In one embodiment of the improvement module 110, step 320 resolves whitespace mismatches by selecting the version of the mismatched sequence from among the candidate volumes that has the least amount of whitespace (i.e., the shortest whitespace). In this selection process, a newline (end of paragraph marker) is treated as being longer than a space. Thus, if a mismatched sequence in one volume contains only a newline, while the mismatched sequence in another volume contains only a space, the improvement module 110 selects the sequence with the space as correct.

In step 322, the improvement module 110 uses the corrected (golden) version of the text in the basis array to correct the candidate volumes. In one embodiment, the corrected text is used to directly correct the text of the candidate digital volumes. For example, the improvement module 110 may substitute some or all of the corrected version of the text for the text of the candidate volumes to produce the corrected volumes 128.

In another embodiment, the improvement module 110 uses the corrected version of the text in the basis array to produce corrected scanjobs 126 for the digital volumes 124, and then uses the corrected scanjobs 126 to produce the corrected volumes 128. In this latter embodiment, the improvement module 110 uses the corrected version of the text to create an intermediate corrected version of each candidate volume. Specifically, for a given candidate volume, the improvement module 110 inserts the resolved mismatch sequences at the appropriate places in the text of that volume. The text of the intermediate corrected volume thus contains the text that was identical across all candidate volumes, the resolved portions (mismatched sequences that were resolved), and the mismatched sequences that were not resolved.

The improvement module 110 next uses the corrected intermediate volumes to correct the associated scanjobs 122. As previously discussed, a digital volume 124 may have been produced from multiple scanjobs 122 of the same book. The improvement module 110 uses the corrected intermediate volume to correct the one or more scanjobs 122 from which it was produced. For this task, the improvement module 110 treats the corrected intermediate volume as the basis volume and treats the scanjobs 122 as the comparison volumes. The improvement module 110 performs alignment and resolution (steps 318 and 320) to resolve any mismatches in the scanjobs 122 using the above-described techniques, except, instead of using voting to select the correct mismatched sequence, the corresponding sequence in the corrected intermediate volume is trusted as being correct. The improvement module 110 stores the corrected scanjobs 126 produced through this process in the storage module 120.

The improvement module 110 then uses the corrected scanjobs 126 to produce corrected digital volumes 128 that lack the errors contained within the original, uncorrected digital volumes 124. In addition, if a new volume is introduced to the storage module 120 through, e.g., the scanning of a new library book, the improvement module 110 can match the new volume with the existing volumes to form a new set of candidate volumes. The improvement module 110 can then repeat the process described above to correct any errors in the new volume, and possibly correct additional errors in the preexisting volumes as well.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automatically correcting errors in digital volumes. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for correcting textual errors in digital volumes in a corpus, the method comprising:
   receiving a plurality of candidate volumes comprising a basis volume and a plurality of comparison volumes;
   comparing the basis volume with the plurality of comparison volumes to identify identical sequences of text that are identical across all of the plurality of candidate volumes and mismatched sequences of text that contain different text in different candidate volumes;
   resolving at least some of the mismatched sequences by comparing the different text in the different candidate volumes to ascertain correct text for the mismatched sequences by:
      determining a type of mismatch for a given mismatched sequence that contains different versions of text in different candidate volumes; and
      applying a resolution technique to the given mismatched sequence selected responsive to the type of mismatch; and
   correcting errors in the plurality of candidate volumes using the ascertained correct text.

2. The method of claim 1, wherein comparing the basis volume with the plurality of comparison volumes comprises:
   separately comparing the basis volume with each comparison volume to identify a set of text sequences that occur in both the basis volume and a comparison volume; and
   comparing the set of text sequences to determine identical text sequences that occur in all of the plurality of candidate volumes.

3. The method of claim 1, further comprising:
   identifying locations of the identical sequences of text in all of the plurality of candidate volumes.

4. The method of claim 1, further comprising:
   determining a proportion of text that a comparison volume of the plurality of comparison volumes has in common with the basis volume; and
   filtering the comparison volume of the plurality of comparison volumes out of the plurality of candidate volumes responsive to the proportion of text being below a specified threshold proportion.

5. The method of claim 1, wherein the type of mismatch is determined to be a spelling mismatch and applying the resolution technique comprises:
   considering each version of the different versions of text for the given mismatched sequence in different candidate volumes as a vote for that version; and
   selecting a given version of text for the given mismatched sequence as correct text for the mismatched sequence responsive to a number of votes the given version of text receives.

6. The method of claim 1, wherein the type of mismatch is determined to be a whitespace mismatch and applying the resolution technique comprises:

determining an amount of whitespace in the given mismatched sequence in each of the plurality of candidate volumes; and selecting a given amount of whitespace as correct responsive to the determined amount of whitespace in the given mismatched sequence in each of the plurality of candidate volumes.

7. A computer system for correcting textual errors in digital volumes in a corpus, comprising:

a non-transitory computer-readable storage medium comprising executable computer program code for:

receiving a plurality of candidate volumes comprising a basis volume and a plurality of comparison volumes;

comparing the basis volume with the plurality of comparison volumes to identify identical sequences of text that are identical across all of the plurality of candidate volumes and mismatched sequences of text that contain different text in different candidate volumes;

resolving at least some of the mismatched sequences by comparing the different text in the different candidate volumes to ascertain correct text for the mismatched sequences by:

determining a type of mismatch for a given mismatched sequence that contains different versions of text in different candidate volumes; and applying a resolution technique to the given mismatched sequence selected responsive to the type of mismatch; and correcting errors in the plurality of candidate volumes using the ascertained correct text; and a processor for executing the computer program code.

8. The computer system of claim 7, wherein comparing the basis volume with the plurality of comparison volumes comprises:

separately comparing the basis volume with each comparison volume to identify a set of text sequences that occur in both the basis volume and a comparison volume; and comparing the set of text sequences to determine identical text sequences that occur in all of the plurality of candidate volumes.

9. The computer system of claim 7, further comprising:
identifying locations of the identical sequences of text in all of the plurality of candidate volumes.

10. The computer system of claim 7, further comprising:
determining a proportion of text that a comparison volume of the plurality of comparison volumes has in common with the basis volume; and filtering the comparison volume of the plurality of comparison volumes out of the plurality of candidate volumes responsive to the proportion of text being below a specified threshold proportion.

11. The computer system of claim 7, wherein the type of mismatch is determined to be a spelling mismatch and applying the resolution technique comprises:

considering each version of the different versions of text for the given mismatched sequence in different candidate volumes as a vote for that version; and selecting a given version of text for the given mismatched sequence as correct text for the mismatched sequence responsive to a number of votes the given version of text receives.

12. The computer system of claim 7, wherein the type of mismatch is determined to be a whitespace mismatch and applying the resolution technique comprises:

determining an amount of whitespace in the given mismatched sequence in each of the plurality of candidate volumes; and selecting a given amount of whitespace as correct responsive to the determined amount of whitespace in the given mismatched sequence in each of the plurality of candidate volumes.

13. A non-transitory computer-readable storage medium storing executable computer program instructions for correcting textual errors in digital volumes in a corpus, the computer program instructions comprising instructions for:

receiving a plurality of candidate volumes comprising a basis volume and a plurality of comparison volumes;

comparing the basis volume with the plurality of comparison volumes to identify identical sequences of text that are identical across all of the plurality of candidate volumes and mismatched sequences of text that contain different text in different candidate volumes;

resolving at least some of the mismatched sequences by comparing the different text in the different candidate volumes to ascertain correct text for the mismatched sequences by:

determining a type of mismatch for a given mismatched sequence that contains different versions of text in different candidate volumes; and applying a resolution technique to the given mismatched sequence selected responsive to the type of mismatch; and correcting errors in the plurality of candidate volumes using the ascertained correct text.

14. The non-transitory computer-readable storage medium of claim 13, wherein comparing the basis volume with the plurality of comparison volumes comprises:

separately comparing the basis volume with each comparison volume to identify a set of text sequences that occur in both the basis volume and a comparison volume; and comparing the set of text sequences to determine identical text sequences that occur in all of the plurality of candidate volumes.

15. The non-transitory computer-readable storage medium of claim 13, further comprising:

identifying locations of the identical sequences of text in all of the plurality of candidate volumes.

16. The non-transitory computer-readable storage medium of claim 13, wherein the type of mismatch is determined to be a spelling mismatch and applying the resolution technique comprises:

considering each version of the different versions of text for the given mismatched sequence in different candidate volumes as a vote for that version; and selecting a given version of text for the given mismatched sequence as correct text for the mismatched sequence responsive to a number of votes the given version of text receives.

17. The non-transitory computer-readable storage medium of claim 13, wherein the type of mismatch is determined to be a whitespace mismatch and applying the resolution technique comprises:

determining an amount of whitespace in the given mismatched sequence in each of the plurality of candidate volumes; and selecting a given amount of whitespace as correct responsive to the determined amount of whitespace in the given mismatched sequence in each of the plurality of candidate volumes.

18. The non-transitory computer-readable storage medium of claim 13, further comprising:

determining a proportion of text that a comparison volume of the plurality of comparison volumes has in common with the basis volume; and filtering the comparison volume of the plurality of comparison volumes out of the plurality of candidate volumes responsive to the proportion of text being below a specified threshold proportion.

* * * * *